United States Patent [19]
Guaraldi et al.

[11] Patent Number: 5,233,761
[45] Date of Patent: Aug. 10, 1993

[54] METHOD AND APPARATUS FOR THE ALIGNMENT OF SEVERAL, MACHINE UNITS ARRANGED IN SERIES

[75] Inventors: Glenn A. Guaraldi, Kingston; Michael L. Newsky, Barrington, both of N.H.; Robert R. Giordano; Ornberg, John H., both of Westerly, R.I.

[73] Assignee: Heidelberg Harris, Inc., Dover, N.H.

[21] Appl. No.: 763,679

[22] Filed: Sep. 23, 1991

[51] Int. Cl.$^5$ .......................... G01B 5/25; G01B 11/27
[52] U.S. Cl. ......................................... 33/655; 33/657;
  33/286; 33/DIG. 21; 356/399; 101/485
[58] Field of Search ......... 33/655, 657, 645, DIG. 21,
  33/286, 613, 293; 356/399; 101/479, 481, 485

[56] References Cited

U.S. PATENT DOCUMENTS

| | | | |
|---|---|---|---|
| 3,591,284 | 7/1971 | Liebman | 33/617 |
| 3,604,121 | 9/1971 | Hull | 33/657 |
| 3,704,522 | 12/1972 | Blubaugh et al. | 33/286 |
| 3,816,935 | 6/1974 | Wilmot | 33/645 |
| 4,290,289 | 9/1981 | Capriotti | 33/657 |
| 4,319,406 | 3/1982 | Pehrson, Sr. et al. | 33/657 |

FOREIGN PATENT DOCUMENTS 3012986 10/1981 Fed. Rep. of Germany .

Primary Examiner—William A. Cuchlinski, Jr.
Assistant Examiner—Alvin Wirthlin
Attorney, Agent, or Firm—Tarolli, Sundheim & Covell

[57] ABSTRACT

A method for aligning at least one machine unit (36) on a base (42) comprises the steps of installing alignment markers (28) on the parts (12, 14) of a machine unit (36) to be aligned, and correcting the locations of the alignment markers (28) to effect a correction in the locations of the parts (12, 14) on which they are installed. The alignment markers (28) are installed in positions which have precise relationships to the positions of function specific openings (20) in the parts (12, 14) which are preferably formed in metal cutting machining. A correction in the locations of the alignment markers (28) thus effects a correction in the locations of the function specific openings (20). The alignment markers (28) enable an alignment of parallel parts (12, 14) of a single machine unit (36) as well as alignment of several machine units (36, 38, 40) arranged one after the other in series.

3 Claims, 2 Drawing Sheets

METHOD AND APPARATUS FOR THE ALIGNMENT OF SEVERAL, MACHINE UNITS ARRANGED IN SERIES

FIELD OF THE INVENTION

The present invention relates to a method and an apparatus for the alignment of several machine units arranged in series.

BACKGROUND OF THE INVENTION

German Patent Publication DE-OS 3012986 discloses a device for the erection of heavy loads on a platform. The device balances out discrepancies in the exact positioning and location of a deposited heavy load. Position adjustment shoes connected with an oil force supply means build up an oil cushion which effects a correction in the position of a heavy load, the position of which can be changed on the platform.

With the device disclosed in German Patent Publication DE-OS 3012986, only a single machine unit can be erected individually and in an exact position. Furthermore, extensive peripheral access is necessary to make use of the position adjustment shoes.

In a printing press, a plurality of printing units are arranged in series. Each printing unit includes printing cylinders extending between the side frames of the printing unit. The printing cylinders should extend horizontally. When installing a printing unit, the installer places a hand level on the edges of the side frames of the printing unit. The printing unit is then moved until the top and side edges of the side frames are horizontal and vertical, as indicated by the hand level. This method is based on the assumption that the printing cylinders in the printing unit will be horizontal when the side frames are level. When a printing unit is installed on a shop floor, dimensional tolerances between the position of a cylinder and the edge of a side frame can result in the cylinder being installed in an inclined, non-horizontal position even though the edges of the side frames are horizontal and vertical.

SUMMARY OF THE INVENTION

The present invention provides a method for manufacturing and installing one or more machine units having parts which must be accurately manufactured and installed. The method is especially applicable to machine units in which the parts to be accurately manufactured and installed have function specific openings which must be accurately located relative to each other, and which are formed in a metal cutting process. The method includes the step of providing alignment markers on the parts. The alignment markers on each part are positioned accurately with reference to the locations of the function specific openings. During manufacture and installation of the machine unit having the alignment markers, a movement of a part to correct the locations of the alignment markers effects a correction in the locations of the associated function specific openings. The alignment markers thus enable alignment of the parts within each machine unit, as well as alignment of adjacent machine units.

The invention enables exact alignment of function specific openings in machine parts or machine units. The function specific openings are aligned with each other indirectly by accurately aligning the alignment markers with each other. The alignment markers are located in alignment openings in the parts which have the function specific openings. The relationship between the positions of the function specific openings and the positions of the alignment openings formed in a machine part can be maintained more closely than the relationship between the positions of the function specific openings and the position of a different portion of the machine part, such as an edge of the machine part. This is especially true when the function specific openings and the alignment openings are formed in a boring operation performed on the machine part, because the relationship between the positions of openings formed in a boring operation can be controlled more accurately than the relationship between the position of an opening and the position of an edge of the machine part.

In practice of the method according to the invention, the alignment markers, when erecting a first series of machine parts on a base surface, establish a first horizontally extending alignment line. When erecting a second series of machine parts on the base surface, the alignment markers establish a second horizontally extending alignment line parallel to the first horizontally extending alignment line. When erecting machine parts which are arranged parallel and side-by-side, the alignment markers establish a horizontally extending alignment line which extends at a right angle to both of the above-mentioned horizontally extending alignment lines. The invention advantageously enables a longitudinal alignment of successive machine parts in a row as well as lateral alignment of parallel, side-by-side machine parts, with associated alignment of the function specific openings in the machine parts. The alignment in longitudinal and lateral directions at an early stage in the assembly and installation of the machine units saves time by avoiding corrections in their positions which might otherwise be needed thereafter.

In addition to enabling longitudinal alignment between successive machine units in a row, the parallel horizontal alignment lines described above enable the distance between successive machine units to be accurately measured and adjusted.

The invention further comprises a machine unit which is assembled and installed in accordance with the method described above. In a preferred embodiment of the invention, the machine unit is a printing unit for use in a printing press comprising a plurality of printing units. The printing unit has parallel side walls. A plurality of the printing units are installed in a row extending in a direction parallel to the side walls. Each of the side walls has at least one bore in which a bearing supports an end of a printing cylinder. The bores are the function specific openings. Each printing cylinder in the printing press should be installed accurately with reference to the positions of each other printing cylinder in the printing press. Therefore, each bore in a side frame should be assembled and installed accurately with reference to each other bore in each other side frame in the printing press.

The alignment markers are constructed as alignment openings which receive alignment pins. The alignment openings are formed in the side frames in the same hole-forming operations which form the bores for the bearings. The same relationship between the positions of the bores and the positions of the alignment openings is maintained in each hole-forming operation on each side frame, and a low tolerance is maintained. Importantly, the relationship between the positions of the bores and the positions of the alignment openings can be maintained more closely than the relationship between the positions of the bores and the positions of edges of the side frames, because the bores and the alignment openings are formed in a single hole-forming operation, whereas the bores and the edges of the side frame are formed in different manufacturing operations.

Preferably, the side frames in a printing unit are connected to each other by tie bars. The alignment pins on each side frame establish a horizontal alignment line. The locations of the two side frames are adjusted relative to each other so that the two alignment lines are parallel and level with each other. The bores in the two side frames are thus adjusted into their desired locations indirectly by adjusting the locations of the alignment pins. The two side frames are then fixed relative to each other by the tie bars. When a first printing unit is installed, the two parallel alignment lines established by the alignment pins serve a longitudinal alignment lines for other printing units which ar installed in series with the first printing unit.

The printing units which are installed in series can be supported on blocks which are pre-arranged before the printing units are placed on the blocks. Some of the blocks have V-shaped grooves in which alignment pins on the side frames of a printing unit are received. The printing unit is thus supported on the blocks, and will be spaced from an adjacent printing unit the same distance that the blocks are spaced from adjacent blocks. A horizontally extending alignment line can be formed between the side frame of a printing unit and a pair of blocks associated with the side frame.

The alignment markers in accordance with the invention are not limited to alignment openings and alignment pins. Rather, alignment regions on machine parts can also be used, the correct position of which can be determined by optical measuring devices such as lasers. The alignment regions on a machine part can be constructed in such a way that they have photo-electric sensors, optically sensitive surfaces, or other optical measuring devices.

BRIEF DESCRIPTION OF THE DRAWINGS

The foregoing and other features of the invention will become apparent to those skilled in the art to which the invention relates upon reading the following description of preferred embodiments of the invention in view of the accompanying drawings, wherein.

DESCRIPTION OF PREFERRED EMBODIMENTS

The present invention relates to machine units which are arranged in series. For example, the invention is applicable to an energy producing engine consisting of gas or steam turbine units and generators arranged in series, as well as being applicable to paper processing machines arranged in series. Additionally, stationary large capacity diesel engines with transmissions for the assembly into a hull can simply be aligned relative to each other in accordance with the invention.

In a preferred embodiment of the invention, a plurality of printing units are arranged in series. The invention relates both to assembly of a printing unit and to installation of a plurality of printing units in series.

Assembly of Printing Unit

Figure 1:
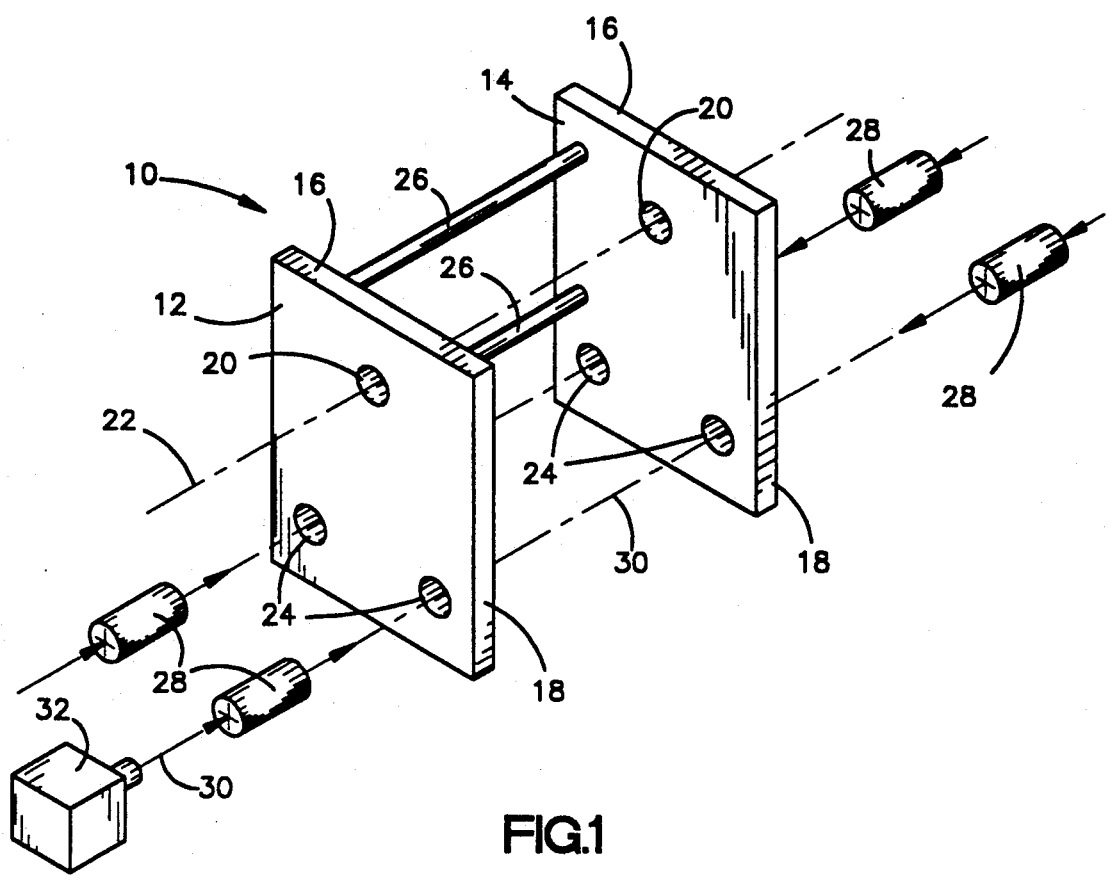
FIG. 1 is a schematic view of a printing unit constructed in accordance with the invention.

As shown in FIG. 1, a printing unit 10 has two side frames 12 and 14 which are parallel to one another. The side frames 12 and 14 of the printing unit 10 each have a rectangular shape with a horizontally extending edge 16 and a vertically extending edge 18. Each of the side frames 12 and 14 also has a bore 20 centered on a horizontal axis 22. The bores 20 are for supporting roller bearings (not shown) in which a printing cylinder (not shown) extending between the side frames 12 and 14 is journalled for rotation about the axis 22. Each side frame 12 and 14 also has a pair of alignment openings 24. Each alignment opening 24 on one of the side frames 12 and 14 is coaxial with a respective alignment opening 24 on the other one of the side frames 12 and 14. Each of a plurality of alignment pins 28 is receivable in a respective one of the alignment openings 24. The alignment pins 28 are likewise coaxial when received in the alignment openings 24. Tie bars 26, two of which are shown in FIG. 1, fix the side frames 12 and 14 to each other in positions wherein the bores 20 and the alignment openings 24 are coaxial as described above.

Each of the side frames 12 and 14 is manufactured with a minimum tolerance in the spacing between the bore 20 and the associated alignment openings 24. The relationship between the positions of the alignment openings 24 and the position of the bore 20 in a side frame 12 or 14 can be maintained more closely than the relationship between the position of the bore 20 and position of an edge 16 or 18. This is because a dimensional tolerance can be maintained when forming holes in a single boring operation which is closer than the dimensional tolerance which can be maintained in separate manufacturing operations which respectively form a bore and an edge of a side frame. Therefore, in accordance with the invention, the alignment openings 24 and the associated bore 20 in a side frame are formed in a single boring operation. The relationship between the positions of the alignment openings 24 and the position of the associated bore 20 is predetermined and is established with a close dimensional tolerance when the side frame is manufactured. The same relationship between the positions of the alignment openings 24 and the associated bore 20 is repeated when another side frame is manufactured. That relationship is repeated most precisely when the side frames 12 and 14 are placed atop one another and are bored together.

After each of the side frames 12 and 14 is manufactured with the same predetermined relationship between the positions of the alignment openings 24 and the position of the associated bore 20, the side frames 12 and 14 are fixed to each other as shown in FIG. 1. The side frame 12 and the side frame 14 are moved relative to each other until the alignment openings 24 are coaxial with each other as shown in FIG. 1. The location of the alignment openings 24 relative to each other can be determined by measuring the location of the alignment pins 28 relative to each other when the alignment pins 28 are received in the alignment openings 24. Alternately, the locations of the alignment openings 24 relative to each other can be determined with reference to an alignment line 30 which, by way of example, is shown in FIG. 1 to be established by a laser 32. Another alternate method of establishing a coaxial relationship between the alignment openings 24 on the two side frames 12 and 14 would involve temporary insertion of tie bars 26 or other rigid members in and between opposed pairs of alignment openings 24 to hold them in a coaxial relationship.

Because the position of the bore 20 on the side frame 12 and the positions of the alignment openings 24 on the side frame 12 have the same relationship to each other as do the bore 20 and the alignment openings 24 on the side frame 14, the bores 20 on the side frames 12 and 14 will also be coaxial with each other when the alignment openings 24 on the side frames 12 and 14 are coaxial with each other. The bores 20 will therefore be coaxial with each other with a close dimensional tolerance when the side frames 12 and 14 are fixed to each other. A printing cylinder extending between the bores 20 will consequently extend horizontally with the same low dimensional tolerance. The alignment openings 24 and/or the alignment pins 28 thus serve as references for the locations of the bores 20 when the printing unit 10 is assembled.

Installation of Printing Units

Figure 2:
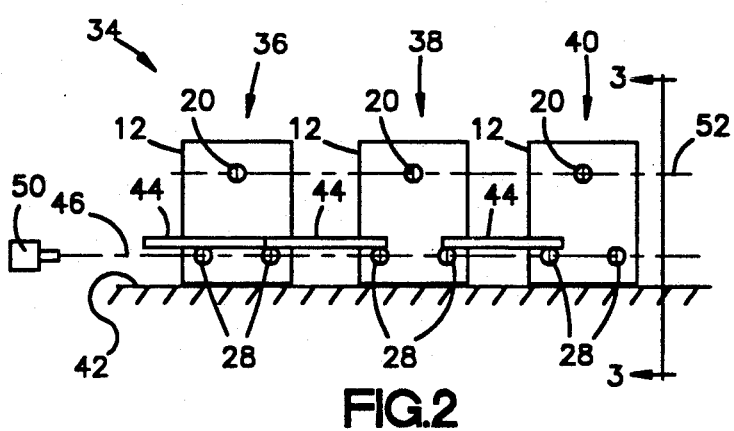
FIG. 2 is a schematic view of a series of printing units like the printing unit of FIG. 1.
Figure 3:
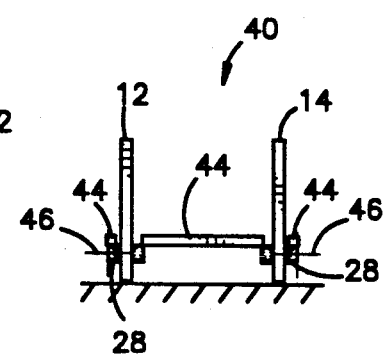
FIG. 3 is a view taken on line 3—3 of FIG. 2.
Figure 7:
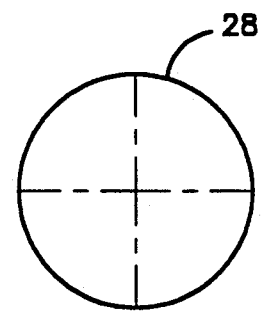
FIG. 7 is a view of an alignment pin constructed in accordance with the invention.

As shown in FIG. 2, a printing press 34 comprises a plurality of printing units 36, 38 and 40 arranged in series. For clarity of illustration, each of the printing units 36, 38 and 40 is identical to the printing unit 10 described above, and the same reference numbers are used to identify corresponding parts of the printing units 36, 38 and 40. The printing unit 36 is first placed on a base surface 42. A hand level 44 is placed across the alignment pins 28 on the side frame 12. As shown in FIG. 3, the same or another hand level 44 is similarly placed across the alignment pins 28 on the side frame 14, as well as between coaxial pairs of alignment pins 28 on the side frames 12 and 14. The side frames 12 and 14 are then moved relative to each other until all of the alignment pins 28 are shown by the hand level(s) 44 to be level with each other. When the printing unit 36 is thus installed with the alignment pins 28 level with each other, the alignment pins 28 on the side frame 12 establish a horizontally extending alignment line 46, as shown in FIG. 2. The alignment pins 28 on the side frame 14 similarly establish a horizontally extending alignment line 46 which is parallel and level with the line 46 extending across the side frame 12. Preferably, the centers of the alignment pins 28 are visibly marked (FIGS. 1 and 7), and the horizontally extending alignment lines 46 are considered to extend through the centers of the alignment pins 28.

After the printing unit 36 is installed as described above, the printing units 38 and 40 are installed in succession as shown in FIG. 2. After the printing unit 38 is placed on the base surface 42, the side frames 12 and 14 of the printing unit 38 are moved relative to each other until all of the alignment pins 28 on the printing unit 38 are level with each other and with the alignment pins 28 on the printing unit 36. The level positions of the alignment pins 28 on the printing unit 38 can be established by the use of hand levels 44 placed across and between the alignment pins 28 as shown in FIGS. 2 and 3.

Alternately, the level positions of the alignment pins 28 on the printing units 36 and 38 can be established with reference to the horizontally extending alignment lines 46 as projected by a laser 50. In the latter case, the alignment pins 28 could be equipped with optical targeting means of suitable construction, or the visibly marked centers of the alignment pins 28 could serve as alignment targets.

In another alternate embodiment of the invention, the horizontally extending alignment line 46 could be established simply by drawing a string in a straight line across the visibly marked centers of the alignment pins 28 on the printing unit 36, and extending the string beyond the printing unit 36 as a reference for location of the centers of the alignment pins 28 on the printing units 38 and 40.

When the printing units 36, 38 and 40 are installed with all of the associated alignment pins 28 level with each other as described above, the bores 20 in the printing units 36, 38 and 40 will also be level with each other, as indicated by the horizontally extending alignment line 52 shown in FIG. 2. Another horizontally extending alignment line 52 (not shown) similarly extends across the side frames 14. The bores 20 will be level with each other on the lines 52 because the position of each bore 20 on each of the side frames 12 and 14 has the same relationship to the positions of the associated alignment openings 24. Such relationships are maintained uniformly from one side frame to the other with a minimum dimensional tolerance, and the bores 20 are thus centered on the lines 52 with the same minimum dimensional tolerance. The printing cylinders extending across the printing units 36, 38 and 40 will consequently be horizontal and level with each other.

Figure 4:
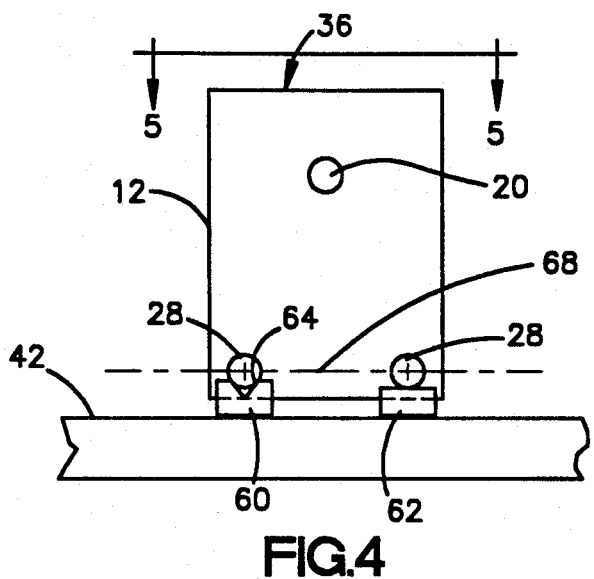
FIG. 4 is a schematic view of a printing unit installed on a base surface in accordance with the invention.
Figure 5:
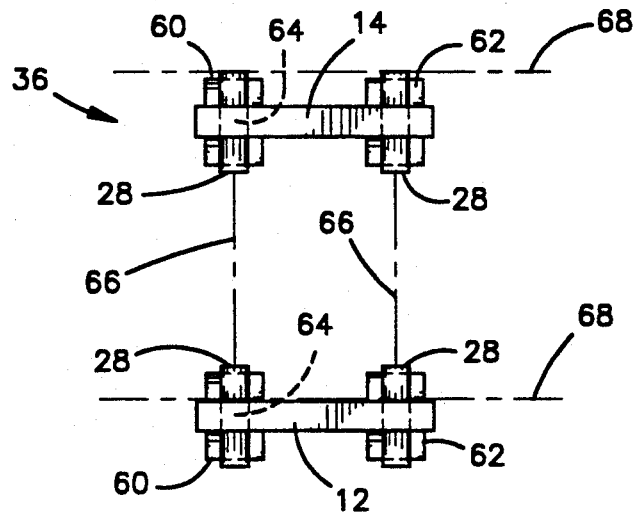
FIG. 5 is a view taken on line 5—5 of FIG. 4.

Another alternate embodiment of the invention is shown in FIGS. 4 and 5. In this embodiment of the invention, the printing units in a printing press are supported on blocks. For clarity of illustration, only the printing unit 36 is shown in FIGS. 4 and 5. The printing unit 36 is supported on a pair of V-blocks 60 and on a pair of rectangular blocks 62. Each of the V-blocks 60 has a V-shaped groove 64 in the upper surface thereof, as shown in FIG. 4. The V-blocks 60 are fixed to the base surface 42 in positions wherein the upper surfaces of the V-blocks 60 are level with each other, and wherein the V-shaped grooves 64 in the V-blocks 60 are centered on a horizontally extending transverse alignment line 66. The rectangular blocks 62 are similarly fixed on the base surface 42 in positions wherein the upper surfaces thereof are level with each other.

The printing unit 36 is supported on the V-blocks 60 and on the rectangular blocks 62. Specifically, as shown in FIG. 4, the alignment pins 28-at one end of the printing unit 36 are received in the V-shaped grooves 64 in the V-blocks 60, and the alignment pins 28 at the other end of the printing unit 36 rest atop the rectangular blocks 62. The alignment pins 28 are thus supported in locations level with each other. The centers of alignment pins 28 on a side frame are aligned on horizontally extending longitudinal alignment lines 68 which are perpendicular to the transverse line 66, and the centers of transversely adjacent alignment pins 28 are aligned as on the transverse line 66. When V-blocks 60 and rectangular blocks 62 for the printing units 38 and 40 are fixed on the base surface 42 in the same manner, the alignment pins 28 on the printing units 38 and 40 will likewise be level with each other and will be centered on the horizontally extending longitudinal alignment lines 68. Consequently, all of the bores 20 in the printing units 36, 38 and 40 will be level with each other so that the printing cylinders supported in the bores 20 will be horizontal and level with each other.

The distance between successive printing units in a row can be established in predetermined amounts by measuring between successive pairs of the V-blocks 60, because the V-blocks 60 capture the associated alignment pins 28 in their positions along the lines 68. Also, the distance between pairs of V-blocks 60 and pairs of rectangular blocks 62 measured along the transverse lines 66 can be repeatedly determined so that the side frames 12 and 14 are consistently parallel with each other. The blocks 60 and 62 are arranged so as to establish vertical planes in which the lines 68 extends as shown in FIG. 5.

Figure 6:
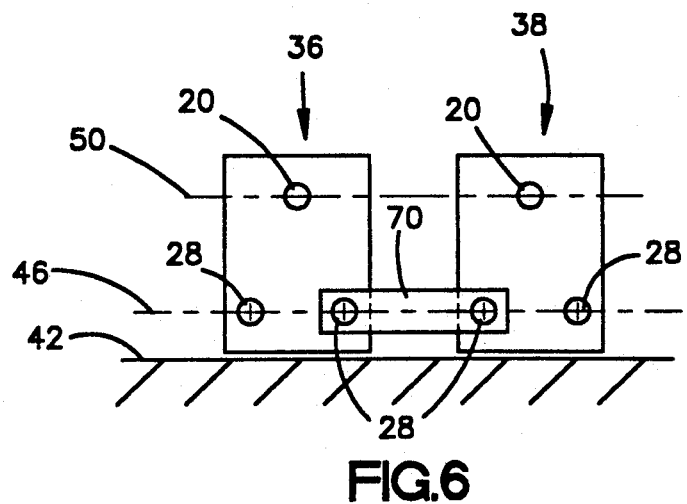
FIG. 6 is a view of a pair of printing units in accordance with an alternate embodiment of the invention.

Another alternate embodiment of the invention is shown in FIG. 6. In this embodiment of the invention, the distance between adjacent printing units 36 and 38 is established by a measuring bar 70 having openings which are spaced a known distance from each other. The openings in the measuring bar 70 are received over the alignment pins 28 as shown.

The alignment pins 28 can also be formed as bolts or other projections on the side frames 12 and 16. Alternately, alignment regions or surfaces which can be detected by a laser scanner can be used in place of the alignment pins 28. The use of a laser scanner assures a highly precise alignment even for very long series of machine units. Additionally, light sources other than lasers can be used. Still further, alignment can be accomplished with the alignment openings 24 even in the absence of alignment pins 28 or other parts associated with the alignment openings 14.

The invention has been described with reference to preferred embodiments. Improvements, changes and modifications will occur to those skilled in the art. Such improvements, changes and modifications are intended to be covered by the appended claims.

Having described the invention, the following is claimed:

1. A method of installing printing units in predetermined positions relative to each other, each printing unit having a pair of side walls which are fixed to each other, each of the side walls in each pair having a bore which is coaxial with a bore in the other side wall in the pair, each of the side walls in each pair also having a pair of alignment openings which are coaxial with a pair of alignment openings in the other side wall in the pair, said method comprising the steps of:

inserting a respective pair of first alignment markers in each of the pairs of alignment openings in a first printing unit;

establishing a pair of first alignment lines, said first alignment lines being horizontal and level with each other;

placing the first printing unit in a predetermined position, including moving the first printing unit to place each of said pairs of first alignment markers on a respective one of said first alignment lines, and thereby placing each of the bores in the first printing unit on a respective one of a pair of second alignment lines, said second alignment lines being horizontal and level with each other and being parallel to said first alignment lines;

inserting a respective pair of second alignment markers in each of the pairs of alignment openings in a second printing unit; and placing the second printing unit in a predetermined position spaced from the first printing unit by moving the second printing unit to place each of said pairs of second alignment markers on a respective one of said first alignment lines, and thereby placing each of the bores in the second printing unit on a respective one of said second alignment lines, the bores in the second printing unit thus being placed in locations that are level with the bores in the first printing unit;

the bores in each of the printing units being centered on a respective axis for a respective printing cylinder, said placing steps placing said axes in locations that are level with each other when placing the bores in locations that are level with each other, said placing steps further comprising the step of establishing a predetermined distance between said axes.

2. A method as defined in claim 1 wherein said placing steps include placing blocks on a base surface, each of said blocks having a surface means for supporting a respective one of said alignment markers in a predetermined position on a respective one of said first alignment lines, said placing steps further including the steps of aligning said blocks with said first alignment lines, measuring and correcting distances between said blocks along said first alignment lines, and arranging said printing units on said blocks by placing said alignment markers, which are then located in said alignment openings as a result of said inserting steps, on said blocks in said predetermined positions.

3. A method as defined in claim 2 wherein each of a plurality of said blocks has a V-shaped groove, each of said alignment markers that are placed in said predetermined positions on said plurality of said blocks comprising a cylindrical alignment pin, said placing steps including the steps of placing each of said cylindrical alignment pins which are then located in a respective one of said alignment openings as a result of said inserting steps, in a respective one of said V-shaped grooves.

* * * * *